(12) United States Patent
Sawano

(10) Patent No.: US 6,530,637 B2
(45) Date of Patent: Mar. 11, 2003

(54) GRADATION REPRODUCTION METHOD AND GRADATION-REPRODUCED IMAGE

(75) Inventor: Mitsuru Sawano, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/969,581

(22) Filed: Oct. 4, 2001

(65) Prior Publication Data

US 2002/0060706 A1 May 23, 2002

(30) Foreign Application Priority Data

Oct. 5, 2000 (JP) ........................ 2000-305656

(51) Int. Cl.$^7$ .............................. B41J 2/205; H04N 1/40
(52) U.S. Cl. ........................ 347/15; 358/3.01; 358/1.9
(58) Field of Search ............... 347/1.5, 43; 358/1.2, 358/1.9, 3.01, 3.06, 3.3, 502, 521, 528, 3.1

(56) References Cited

U.S. PATENT DOCUMENTS 5,832,184 A * 11/1998 Konno et al. ............... 358/1.18
6,404,510 B1 * 6/2002 Sawano et al. ............... 358/1.2

* cited by examiner

Primary Examiner—Lamson Nguyen
(74) Attorney, Agent, or Firm—Sughrue Mion, PLLC

(57) ABSTRACT

The gradation reproduction method is capable of smooth gradation depiction without making graininess of an image conspicuous when gradation levels for reproducing the image are reproduced by dot patterns, and the gradation-reproduced image is depicted by the gradation reproduction method. A plurality of gradation levels including at least a gradation level having an area coverage modulation ratio of approximately 50% are reproduced by periodically arranging dots changing a size thereof in response to the gradation level in an approximately constant interval. And, a gradation level having the area coverage modulation ratio of 10% or less is reproduced by dots having a micro density lower than a micro density of dots for reproducing a solid portion. Moreover, at least one gradation level including a gradation level having the area coverage modulation ratio of approximately 90% is reproduced by periodically arranging dots having a micro density equal to that of the dots for reproducing the solid portion in the approximately constant interval, and by disposing dots having the micro density lower than that of the dots for reproducing the solid portion on gaps among the dots periodically arranged.

11 Claims, 5 Drawing Sheets

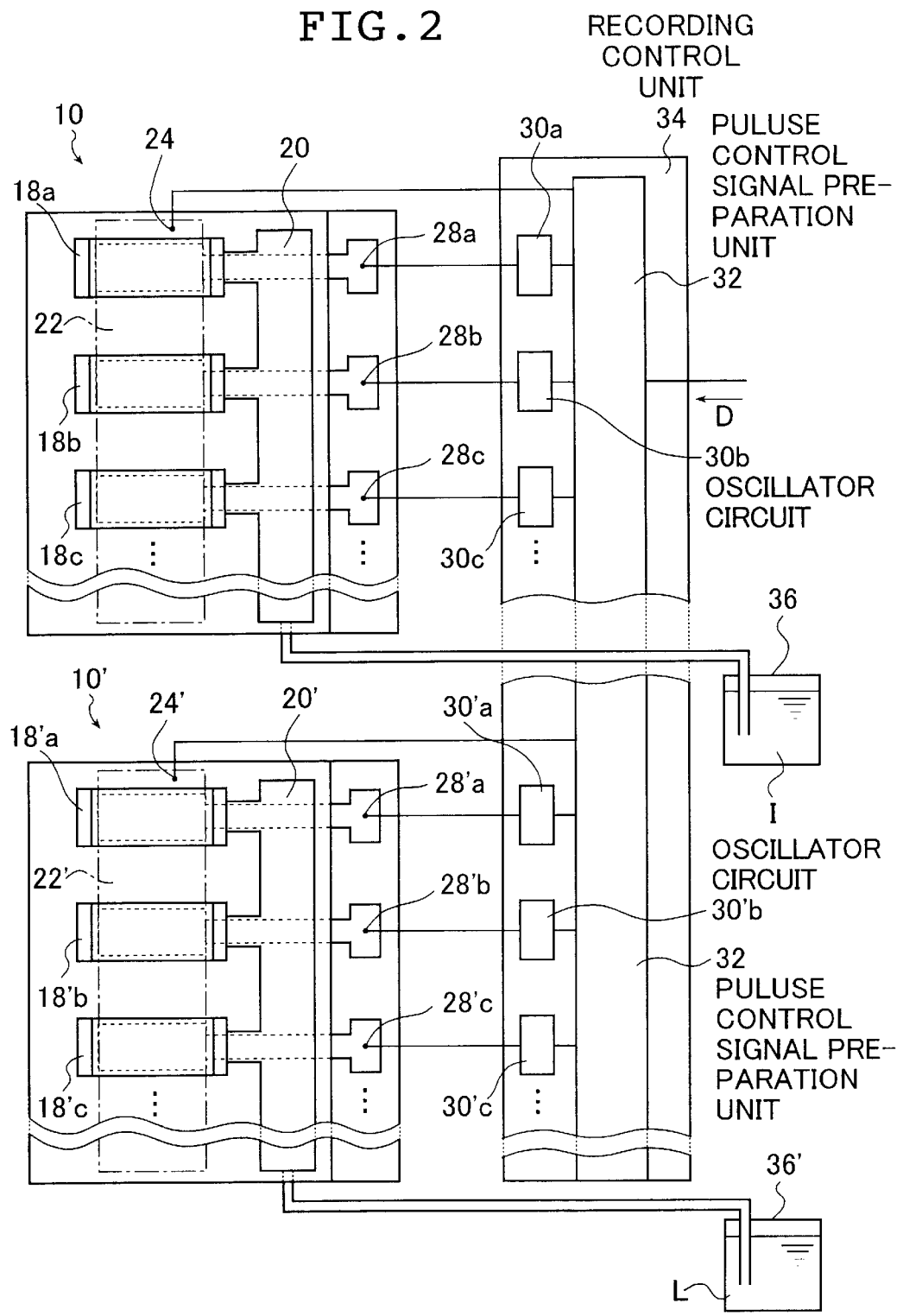

50%

10%

90%

$D_a$
$D_b$

GRADATION REPRODUCTION METHOD AND GRADATION-REPRODUCED IMAGE

BACKGROUND OF THE INVENTION

The present invention relates to a gradation reproduction method for depicting the gradation or tone of an image mainly by the size of dots and to a gradation-reproduced image. More specifically, the present invention relates to a gradation reproduction method used when an image is recorded with an ink-jet printer, a thermal printer, an electrophotographic printer or the like and to a print-output image.

Nowadays, in a printer, various kinds of processing are performed so as to reproduce the gradation of an image smoothly when the image is reproduced.

In an ink-jet printer ejecting ink droplets for image recording, for example, an ejection amount of ink is made constant, meanwhile, the number of dots put on a recording medium is varied in accordance with the gradation of an image, and thus the gradation thereof is reproduced. In such an ink-jet printer, the number of gradation levels (gradients) set in the printer is small. Accordingly, in some cases, the difference between gradation levels becomes unfavorably conspicuous when signal values of the data on an image such as a photographic image are directly converted for image recording and the image is recorded. In order to render the difference between gradation levels inconspicuous, the error diffusion method is used, and the number of gradation levels is increased by using light cyan ink and light magenta ink as well as cyan ink, magenta ink, and yellow ink. Thus, the gradation of an image is depicted smoothly.

The above-mentioned error diffusion method refers to a method, in which when gradation levels of respective pixels are set to the gradation levels proximate thereto, which are set in the printer, setting errors of the gradation level value (gradient) set for a focused pixel as well as of the gradation level values set for the neighboring pixels of the focused pixel are all calculated, and the setting errors of the gradation level values are allotted such that the accumulation of the setting errors of the gradation level values becomes zero.

However, in an ink-jet printer using the error diffusion method, graininess tends to be conspicuous at the middle-level gradation, which is attributed to a random dot arrangement by the error diffusion. Moreover, at the gradation levels on the shadows' side, a tone jump is apt to occur because dots are blurred and their boundaries become indefinite. Such phenomena have been problematic.

Meanwhile, nowadays, proposed is a recording head using an electrostatic force, that is, a recording head, in which a pulse voltage is applied between a movable electrode provided on a vibration plate and a fixed electrode spaced by a minute distance from the vibration plate and disposed parallel thereto to vibrate the vibration plate, thus ink droplets are ejected.

In accordance with such a recording head, a magnitude of deformation of the vibration plate is changed by changing a pulse width of the pulse voltage to be applied, whereby an ink ejection amount is varied. Thus, the size of the dots put on a recording medium can be controlled. Therefore, unlike a conventional image gradation reproduction mode depicting the gradation levels by the number of dots, a novel image gradation reproduction mode depicting the gradation levels by the size of dots may be conceived. What is expected by use of the novel mode is that the graininess and the tone jump are eliminated without requirement of the error diffusion method, and thus a multi-level gradation (variable constant) and high-resolution image is reproduced.

As one method of depicting the gradation levels by the size of dots, there has been known gradation depiction by use of halftone dots, which has been conventionally used in the printing field. In the gradation depiction by use of halftone dots, the gradation levels from the highlights to the shadows is depicted in, for example, ten levels established in accordance with the dot area ratio while the number of dots is set constant.

However, since the dots representing each level of the gradation are conspicuous, the conventional gradation depiction by use of halftone dots cannot be directly used for the ink-jet printer which is required to output an image with such a multi-level gradation as that of photographic images.

In the field of offset printing, the interval between halftone dots which allows the dots to be inconspicuous is represented by 175 LPI (lines per inch). Consequently, in order to smoothly reproduce the gradation levels from the shadows to the highlights by using one kind of ink, that is, setting the concentration of ink constant and employing the number of halftone dots for the middle-level gradation as the number of halftone dots for all the gradation levels, a recording head with a high resolution of at least about 2400 DPI (dots per inch), corresponding to a dot size of about 10 $\mu$m, must be used. However, such a recording head is very expensive. Also in the ink-jet printer, a very expensive recording head with a resolution exceeding 2400 DPI is required, which is not practical. Therefore, it is actually difficult to output a high-quality image with the ink-jet printer to which is applied the conventional gradation depiction by use of halftone dots.

Moreover, also in an electrophotographic printer performing gradation depiction by use of stripes and halftone dots, the dots are conspicuous and the graininess tends to be conspicuous at the highlight gradation levels. These are problems caused by the conventional gradation depiction by use of halftone dots and others.

In a thermal printer of a thermofusion transfer mode, since the gradation depiction by dithering is performed and dither patterns are conspicuous, a high-resolution image cannot be reproduced. This is because the number of gradation levels is small, similarly to the conventional gradation depiction by use of halftone dots.

SUMMARY OF THE INVENTION

An object of the present invention is to provide an image reproduction method capable of solving the foregoing problems and recoding an image without use of processing for the gradation reproduction such as the error diffusion method and the dithering, as a gradation reproduction method enabling a smooth gradation depiction to allow dots and graininess to be unobtrusive, and to provide a gradation-reproduced image.

In order to achieve the foregoing object, the present invention provides a gradation reproduction method, comprising the steps of arranging periodically dots changing a size thereof in response to a gradation level when a plurality of gradation levels for depicting an image are reproduced by dot patterns and reproducing the plurality of gradation levels including at least a gradation level having an area coverage modulation ratio of approximately 50% wherein a gradation level having the area coverage modulation ratio of 10% or less is reproduced by dots having a micro density lower than a micro density of dots for reproducing a solid portion.

The micro density means the maximum among the densities of the dots within a minute range, for example, 10×10

μm dots, which is measured with a microdensitometer and the like. In the case of ink-jet printers, the micro density means the maximum density determined by the optical density of ink. Meanwhile, the solid portion means the portion reproduced by tightly putting dots on a recording medium, namely the darkest portion depictible with dots.

Moreover, an area coverage modulation ratio of X% (X=0 to 100) is represented by the following equation (1), where $D_{100}$ is the macro density of the solid portion, $D_0$ is the macro density of the portion on which dots are not put (the macro density of the white portion in the case where the recording medium is white paper), and D is the macro density of a focused gradation level. The macro density means the size of a pixel unit to be recorded or the density obtained by averaging densities throughout a certain dot pattern, which are measured with a densitometer by use of an aperture having a diameter of 1 to 5 mm.

$$X(\%) = \frac{1 - 10^{-(D-D_0)}}{1 - 10^{-(D_{100}-D_0)}} \times 100 \qquad (1)$$

In other words, the area coverage modulation ratio is a parameter representing the level of the macro density. The higher the macro density is, the higher the area coverage modulation ratio will be. The area coverage modulation ratio corresponds to the known dot area ratio in the case where the dots are halftone dots.

It is preferable that the gradation reproduction method according to claim 1, wherein the gradation level having the area coverage modulation ratio of 10% or less is reproduced by arranging the dots randomly in an inconstant interval.

Moreover, it is also preferable that the gradation reproduction method according to claim 1, wherein at least one gradation level including a gradation level having the area coverage modulation ratio of approximately 90% is reproduced by periodically arranging dots having a micro density equal to the micro density of the dots for reproducing the solid portion in an approximately constant interval, and by arranging the dots having the micro density lower than the micro density of the dots for reproducing the solid portion on gaps among the dots periodically arranged.

Moreover, it is another preferable that the gradation reproduction method according to claim 1, wherein at least one gradation level including the gradation level having the area coverage modulation ratio of approximately 50% is reproduced by changing orientations of dots in response to dot colors.

Furthermore, it is further preferable that the gradation reproduction method be characterized in that the gradation reproduction method according to claim 1, wherein the dots are formed by ejecting ink from a recording head, and ink having an optical density lower than an optical density of ink for reproducing the solid portion is used when gradation levels are reproduced by the dots having the micro density lower than the micro density of the dots for reproducing the solid portion.

In this case, it is still another preferable that the gradation reproduction method according to claim 5, wherein the ink having the lower optical density is used for the recording head different from the recording head using the ink for reproducing the solid portion.

Moreover, it is still further preferable that the gradation reproduction method according to claim 5, wherein the ink having the low optical density is prepared by diluting the ink for reproducing the solid portion with an ink diluent immediately before image recording.

Moreover, the present invention provides a gradation-reproduced image, comprising dot patterns constituting a plurality of gradation levels of an image, the dot patterns including a dot pattern having dots different in size depending on a gradation level which is formed by being arranged periodically in an approximately constant interval in the plurality of gradation levels including at least a gradation level having an area coverage modulation ratio of approximately 50% and a dot pattern which is formed of dots having a micro density lower than a micro density of dos for reproducing a solid portion in a gradation level having the area coverage modulation ratio of 10% or less.

It is also preferable that the gradation-reproduced image be characterized in that the gradation-reproduced image according to claim 8, wherein a dot pattern having dots arranged randomly in an inconstant interval is formed in the gradation level having the area coverage modulation ration of 10% or less.

Moreover, it is another preferable that the gradation-reproduced image be characterized in that the gradation-reproduced image according to claim 8, wherein dots having a micro density equal to the micro density of the dots for reproducing the solid portion are arranged periodically in the approximately constant interval in at least one gradation level including a gradation level having the area coverage modulation ratio of approximately 90%, and dots having a micro density lower than the micro density of the dots for reproducing the solid portion are disposed on gaps among the dots arranged periodically, thus the dot pattern is formed.

Furthermore, it is further preferable that the gradation-reproduced image be characterized in that the gradation-reproduced image according to claim 8, wherein the dot pattern having dots different in orientation depending on each of colors of the dots is formed in a dot pattern of at least one gradation level including the gradation level having the area coverage modulation ratio of approximately 50%.

"Arranging dots periodically at approximately constant intervals" means arranging dots periodically at substantially constant intervals, and is an depiction taking the following into consideration. For example, in the case of a printer using an ink-jet head, the periodical arrangement of dots fluctuates delicately due to a delicate fluctuation of an ejection direction of ink droplets even if the ink droplets are ejected so that the dots can be arranged periodically and if dots cannot be disposed at completely constant intervals due to such mechanical limitations as above and the like, the dots are formed so that the centers of dots may be located at positions shifted by a slight distance (one-fifth of the periodic interval between dots or shorter) from the positions where the dots are to be disposed at constant intervals.

BRIEF DESCRIPTION OF THE DRAWINGS

FIG. 2 is a sectional view taken along a line A-A' in FIG. 1A, schematically showing the structure of the recording head.

DETAILED DESCRIPTION OF THE PREFERRED EMBODIMENTS

Description will be made below in detail for a gradation reproduction method and a gradation-reproduced image of the present invention based on preferred embodiments shown in the accompanying drawings.

Figure 1A:
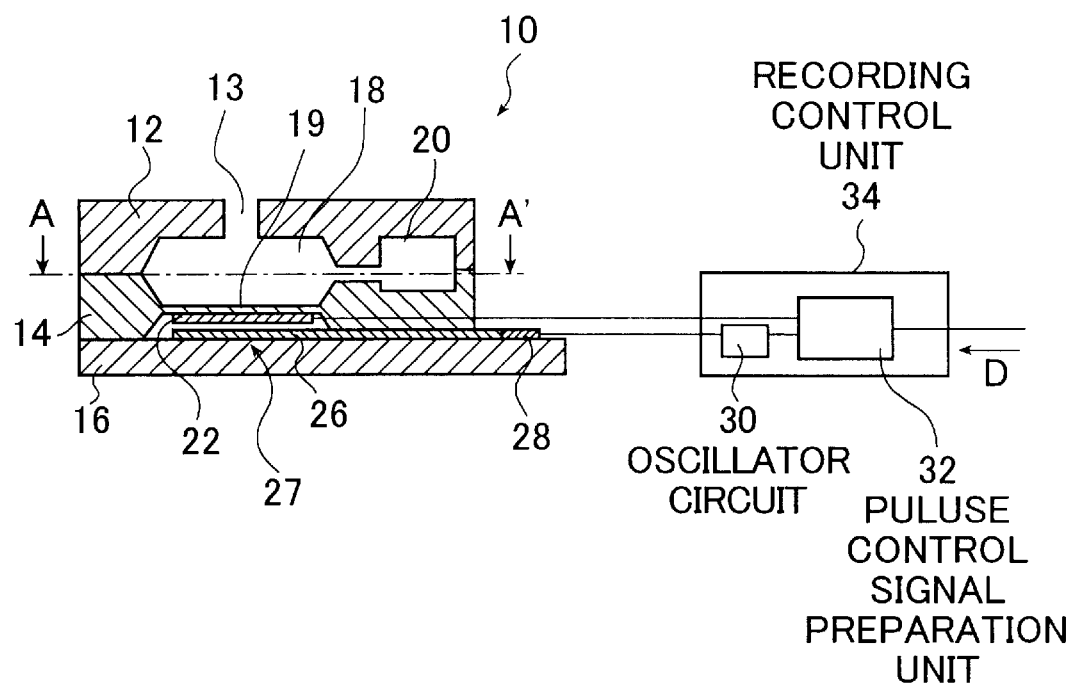
FIGS. 1A and 1B are views showing one embodiment of the sectional structure of a recording head for use in an ink-jet printer for realizing a gradation reproduction method of the present invention.
Figure 1B:
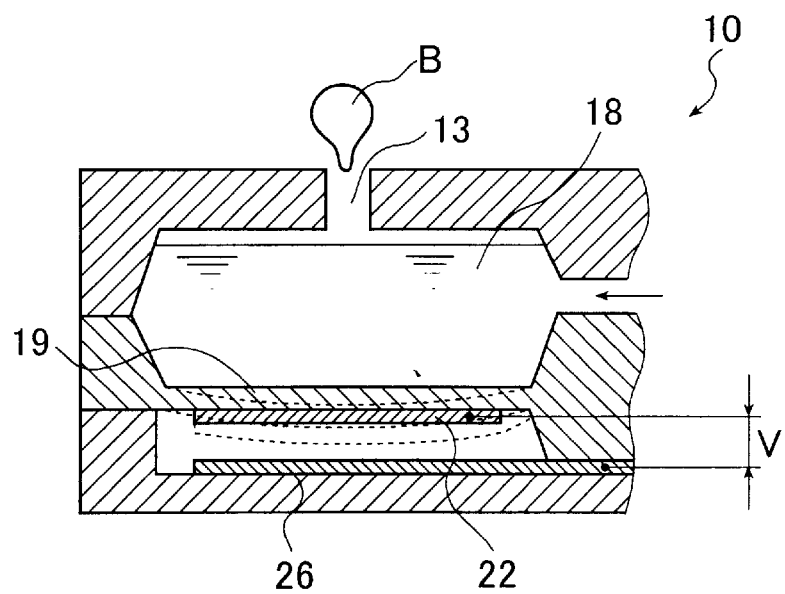

FIGS. 1A and 1B show the sectional structure of a recording head 10 for use in an ink-jet printer realizing an image reproduction method of the present invention.

FIG. 2 schematically shows the structure of the recording head 10 in a section taken along a line A-A' in FIG. 1A. Note that, FIG. 1 shows each structural component with a thickness larger than that of the actual one.

The recording head 10 has a three-layer structure constituted by laminating substrates 12, 14, and 16; an ink ejection nozzle 13 is provided in the substrate 12, and an ink liquid chamber 18 and an ink supply path 20 are defined by the substrates 12 and 14. The ink supply path 20 is connected to an ink tank 36 (see FIG. 2) so as to supply ink to the ink liquid chamber 18.

In the bottom of the ink liquid chamber 18 is formed a vibration plate 19 by partially thinning the substrate 14. Moreover, a movable thin-film electrode 22 of the ink liquid chamber 18 is disposed on a lower surface of the vibration plate 19, and a common terminal 24 (see FIG. 2) is provided at an end of the electrode 22.

On the substrate 16, a fixed thin-film electrode 26 is disposed parallel to the movable thin-film electrode 22 so as to face the same and to be spaced therefrom by a minute distance of, for example, 3 $\mu$m. And a terminal 28 of the fixed thin-film electrode 26 is provided at an end of the substrate 16.

The common terminal 24 and the terminal 28 are connected to a recording control unit 34 including an oscillator circuit 30 and a pulse control signal preparation unit 32, and control voltage signals in the form of pulses are applied to the common terminal 24 and the terminal 28, thus a potential difference is generated between the movable thin-film electrode 22 and the fixed thin-film electrode 26. The movable thin-film electrode 22 and the fixed thin-film electrode 26, between which the potential difference is generated, have conductivity. Accordingly, these electrodes are electrified in polarities different from each other. Consequently, an electrostatic force operates between the electrodes. Then, as shown in FIG. 1B, the vibration plate 19 deforms so as to be convex downward. Meanwhile, when the potential difference is eliminated, the vibration plate 19 is restored, and a pressure in the ink liquid chamber 18 is abruptly increased to eject ink droplet B from the ink ejection nozzle 13. That is to say, the vibration plate 19, the movable thin-film electrode 22, and the fixed thin-film electrode 26 form an electrostatic capacitance-type actuator 27.

Moreover, the electrostatic force between the electrodes can be controlled to control the deformation of the vibration plate 19 by modulating the pulse width of control voltage signals. Thus, the ejection amount of ink droplets can be controlled to control the size of the dots put on a recording medium.

In the recording head 10, a plurality of unit components each having the sectional structure as shown in FIG. 1A are arrayed so as to correspond to a plurality of ink ejection nozzles. FIG. 2 shows one example of the array. In the recording head 10 shown in FIG. 2, ink liquid chambers 18a, 18b, 18c . . . and terminals 28a, 28b, 28c . . . are provided so as to correspond to a plurality of ink ejection nozzles. Moreover, an end of the ink supply path 20 is connected to the ink tank 36 filled with ink I.

Meanwhile, another recording head 10' is connected to the recording control unit 34 to which the recording head 10 is connected through the terminals 28a, 28b, 28c . . . and the common terminal 24.

The recording head 10' has the same configuration as the recording head 10, but is different therefrom in that ink supplied to the recording head 10' is light ink L having an optical density lower than that of the ink I. The optical density of ink implies the logarithm value of the reciprocal of the transmittance of the ink.

In the case of a color recording head of an ink-jet printer for recording color images, the recording heads 10 and 10' may be provided for the ink of cyan and magenta, and the recording head 10 may be provided for yellow and black. It is preferable that the light ink L is light ink of cyan and magenta.

The solid portion in a color, for which ink I and light ink L are provided, is obtained by recording with the ink I without any gap.

The recording control unit 34 includes the pulse control signal preparation unit 32 and the oscillator circuits 30. The pulse control signal preparation unit 32 converts signal values of the image data D from an image data input source, for example, signal values represented in 256 levels, into those gradation level values preset in the recording control unit 34, for example, gradation level values representing a 64-level gradation, which correspond to the signal values. The above image data input source includes a scanner photoelectrically reading an image of a silver photograph or the like having been recorded on a film, an image processing device, a digital still camera and the like. After such conversion as above, the pulse control signal preparation unit 32 prepares pulse control signals based on ejection sequences for ejecting ink droplets from the ink liquid chambers 18. Meanwhile, the oscillator circuits 30 prepare control voltage signals based on the pulse control signals and apply desired control voltage signals to the terminals 28a, 28b, 28c . . . and 28'a, 28'b, 28'c . . . and to the common terminals 24 and 24'. More specifically, the oscillator circuits 30 ground the common terminals 24 and 24' and apply the control voltage signals to the terminals 28a, 28b, 28c . . . and 28'a, 28'b, 28'c . . . .

In the pulse control signal preparation unit 32 are preset dot patterns, in which the size of dots, the density of dots, the number of dots, and the arrangement of dots are determined corresponding to the preset gradation level values. The pulse control signal preparation unit 32 selects dot patterns based on the gradation level values of respective pixels obtained from the signal values of the image data D, and prepares pulse control signals based on the ejection sequences for selected dot patterns.

Specifically, one of pulse control signals $S_1$, $S_2$, and $S_3$ is prepared in response to the gradation level value.

First, the pulse control signal preparation unit 32 prepares the pulse control signal $S_1$ for changing the size of dots according to the gradation level value, that is, for increasing the size of dots as the gradation level in question is closer to the shadows, and periodically arranging dots at substantially constant intervals.

By the pulse control signal $S_1$ are reproduced a plurality of gradation levels including the gradation level having an area coverage modulation ratio of approximately 50%, that is, the middle-level gradation, or alternatively, a plurality of gradation levels in a specified range including the middle-level gradation and even the highlight and shadow gradation levels.

The gradation level having an area coverage modulation ratio of approximately 50% implies the gradation level set in the pulse control signal preparation unit 32 that has an area coverage modulation ratio of 50% or an area coverage modulation ratio proximate to 50%.

Figure 3A:
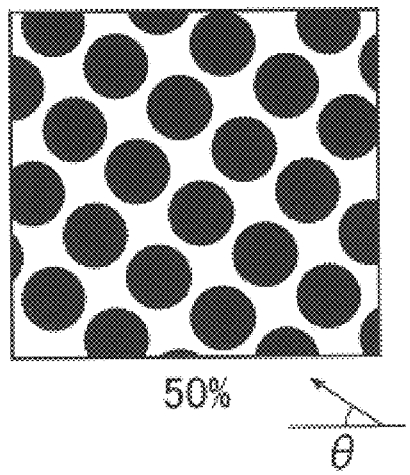
FIGS. 3A to 3E are explanatory views explaining examples of dot patterns for use in the gradation reproduction method of the present invention.

FIG. 3A exemplifies a dot pattern of the gradation level having the area coverage modulation ratio of 50%, which is obtained by the pulse control signal $S_1$.

For the dot pattern shown in FIG. 3A, the ejection amount of ink is controlled so that the recording can be performed with a specified size of dots by use of the ink I, that is, the same ink as ink for use in the gradation depiction of the solid portion.

Dots of the dot pattern are arranged in the direction inclined at an angle θ (in degrees) (or an angle (90-θ) (in degrees)). This inclination angle θ, namely the direction of dot arrangement, is changed in accordance with a color of the ink I. For example, the angle θ is set to 45° for magenta, to 15° for cyan, to 0° for yellow, and to 75° for black.

The pulse control signal preparation unit 32 prepares a pulse control signal $S_2$ so that image recording can be performed by use of the recording head 10' and the pulse width of control voltage signals can be reduced. A gradation level having an area coverage modulation ratio of 10% or less, that is, a highlight gradation level is reproduced by the pulse control signal $S_2$.

Figure 3B:
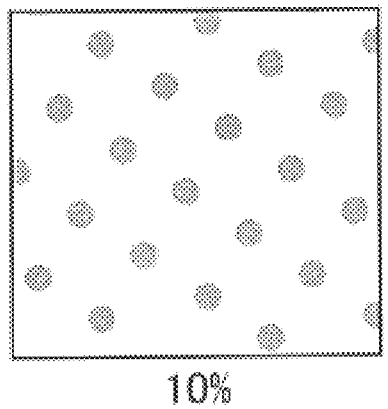

FIG. 3B shows an example of the dot pattern of a highlight gradation level that is prepared based on such a pulse control signal $S_2$.

As shown in FIG. 3B, the dot pattern of a highlight gradation level has a periodical dot arrangement substantially the same as that of the dot pattern of a middle-level gradation shown in FIG. 3A. However, the size of dots is smaller than that of the dot pattern of a middle-level gradation, and since the image recording is performed by use of the light ink L, the density of dots is lower than that of the solid portion.

As described above, in the reproduction of highlight gradation levels, the number of gradation levels can be increased by using the light ink L for printing of dots, thus the macro density can be reproduced accurately according to the gradation level.

Moreover, in order to depict a highlight gradation level, gradation depiction may be employed, in which the size of dots is not changed, but the number of dots is reduced by thinning out the dots of the dot pattern where the dots are periodically arranged at substantially constant intervals.

Figure 3C:
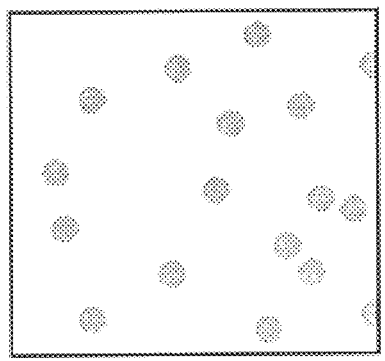

In this case, it is preferable that a highlight gradation level be depicted by a dot pattern where a plurality of dots are randomly arranged at inconstant intervals, as shown in FIG. 3C. When the dots periodically arranged are thinned out to reduce the number of dots, and thus a highlight gradation level is reproduced, a structure comprising a long-period gradation (tone) variation component occurs in the reproduced image. However, according to the random arrangement of dots at inconstant intervals, the occurrence of such a structure can be prevented.

Figure 3D:
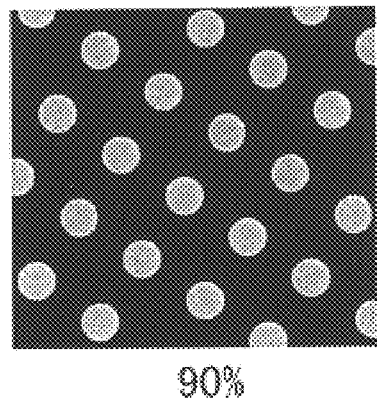
Figure 3E:
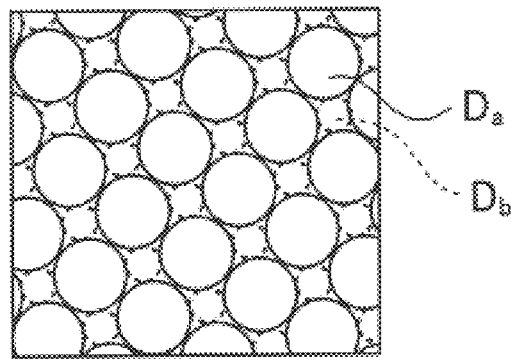

Furthermore, the pulse control signal preparation unit 32 prepares a pulse control signal $S_3$ so that the following effects can be obtained. Specifically, as shown in FIGS. 3D and 3E, dots $D_a$ having a size larger than that of the dots of middle-level gradation and having a density equal to that of the solid portion (because of being printed using the ink I) are arranged at the same intervals as that used for dot patterns of middle-level gradation, and dots $D_b$ having a density lower than that of the solid portion (because of being printed using the light ink L) are disposed on gaps (non-dot portions) among the dots $D_a$. FIG. 3E is a view in which the shading of the dot pattern of FIG. 3D is omitted in order to facilitate understanding of a structure of the dot pattern shown in FIG. 3D.

By the pulse control signal $S_3$, at least one of gradation levels including the gradation level having an area coverage modulation ratio of approximately 90%, that is, shadow gradation levels, is reproduced. The gradation level having an area coverage modulation ratio of approximately 90% implies the gradation level set in the pulse control signal preparation unit 32 that has an area coverage modulation ratio of 90% or an area coverage modulation ratio proximate to 90%.

In other words, the recording control unit 34 prepares the pulse control signal $S_3$ in such a manner that the droplets of the ink I are ejected from the recording head 10 to print the dots $D_a$ and the droplets of the ink L are ejected from the recording head 10' to print the dots $D_b$.

Heretofore, the shadow gradation levels have been depicted by printing a large number of dots. Accordingly, in many cases, a blur has expanded, the non-dot portions have been made dull, and the shadow gradation levels have fallen in the solid portion at the worst. Therefore, in many cases, it has not been possible to depict the shadow gradation levels smoothly. However, the macro density can be adjusted to a desired target density by putting the dots $D_b$ on the non-dot portions as the gaps in the dot arrangement of the dots $D_a$, as shown in FIG. 3D. Therefore, the size of the dots $D_a$ can be reduced to a size smaller than the conventional one, and the dullness of the non-dot portions due to the blur is eliminated. Consequently, the shadow gradation levels can be depicted smoothly.

As described above, the pulse control signal preparation unit 32 prepares the pulse control signals so that the following effects can be obtained. Specifically, while the dots are periodically arranged at substantially constant intervals, the size of dots is changed according to the gradation level value, for example, in such a manner that the size of dots is reduced as the gradation level in question is closer to the highlights and is increased as the gradation level in question is closer to the shadows. Moreover, for the highlight gradation levels, the control voltage signals are sent to the recording head 10' so as to allow the light ink L to be used. On the other hand, for the shadow gradation levels, the control voltage signals are sent to the recording head 10 so as to periodically arrange the dots $D_a$ at constant intervals by use of the ink I and, in addition, the control voltage signals are sent to the recording head 10' so as to dispose the dots $D_b$ by use of the light ink L in the gaps of the dots $D_a$ arranged periodically.

As described above, for the highlight gradation levels, there may be prepared the pulse control signals for the dot pattern, in which the size of dots is not changed, the number of dots is reduced to be below that in dot patterns of middle-level gradation, and the dots are randomly arranged at inconstant intervals.

Figure 4:
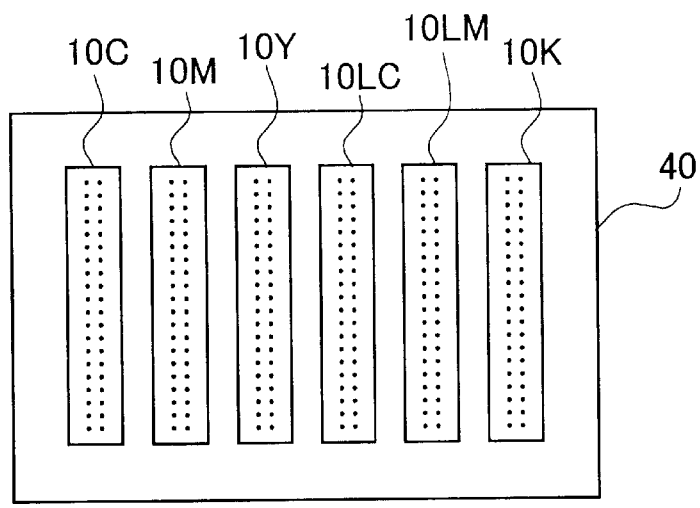
FIG. 4 is a view explaining one embodiment of the configuration of a recording head for realizing the gradation reproduction method of the present invention.

With regard to the recording heads 10 and 10', for example, as shown in FIG. 4, assembled as one color recording head 40 are six recording heads, that is, a recording head 10C for cyan (C), a recoding head 10M for magenta (M), a recording head 10Y for yellow (Y), a recording head 10LC for light cyan (LC), a recording head 10LM for light magenta (LM), and a recoding head 10K for black (K). FIG. 4 is a view of the ink ejection surface of the color recording head 40 for ejecting ink droplets. For each recording head, a plurality of ink ejection nozzles are provided in two lines.

Figure 5:
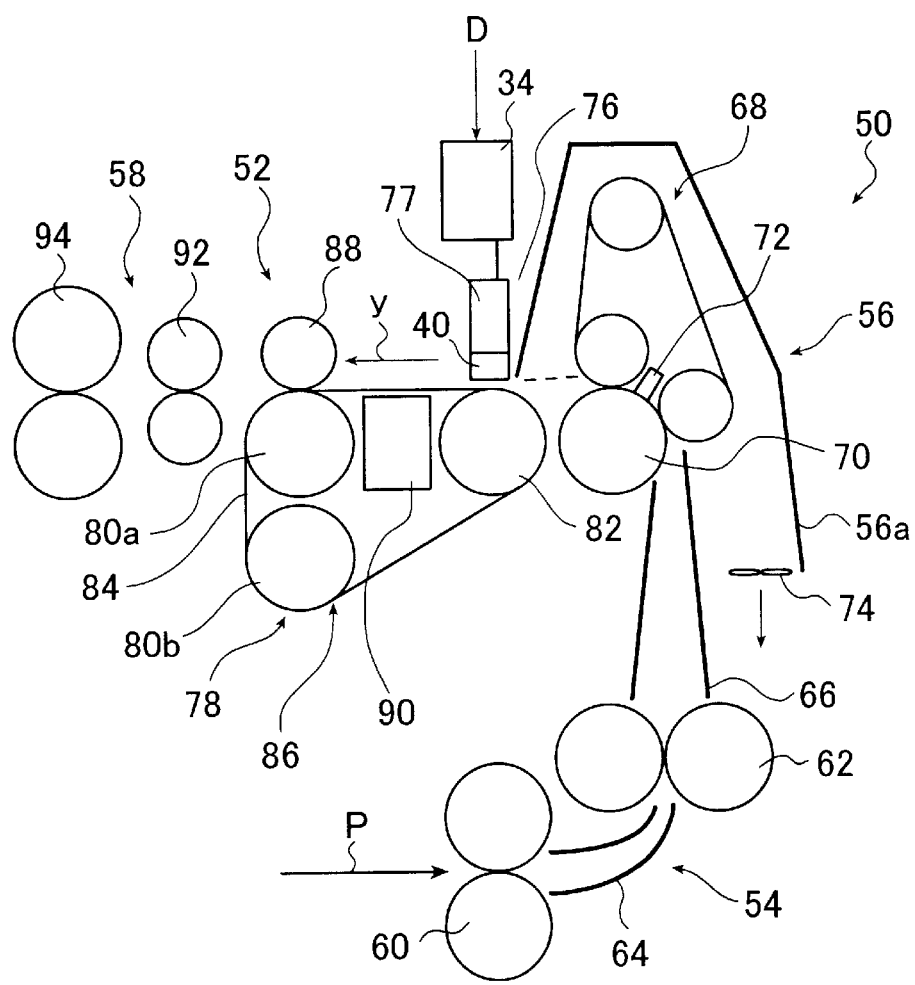
FIG. 5 is an explanatory view explaining the configuration of one embodiment of a printer for realizing the gradation reproduction method of the present invention.

FIG. 5 shows an ink-jet printer 50 using the color recording head 40. The ink-jet printer 50 is constituted by including a recoding unit 52, a supply unit 54, a preheating unit 56, and a discharge unit 58.

The supply unit 54 includes two pairs of carriage rollers 60 and 62 and guides 64 and 66. A recording medium P is carried upward from a lateral position by the supply unit 54, and supplied to the preheating unit 56.

The preheating unit 56 includes a conveyor 68 consisting of three rollers and an endless belt; a press roller 70 pressed against the endless belt from the outside of the conveyor 68; a heater 72 pressed to the press roller 70 from the inside of the conveyor 68; and a ventilation fan 74 ventilating the inside of the preheating unit 56.

The preheating unit 56 heats the recording medium P prior to the ink-jet recording, thus drying of ink ejected on the recording medium P is accelerated to realize high-speed recording. The recording medium P carried from the supply unit 54 is heated at the recording side thereof by the heater 72 while being sandwiched and carried by the conveyor 68 and the press roller 70, then carried to the recording unit 52.

The recording unit 52 is constituted by including a recording head unit 76, the recording control unit 34, and a recording medium carriage unit 78. The recording head unit 76 includes the above-described color recording head 40 and an ink tank unit 77 having ink tanks for ink of the respective colors of C, M, Y, LC, LM, and K. The color recording head 40 is connected to the recording control unit 34. The ink ejection nozzles of the color recording head 40 are disposed in a direction perpendicular to the plane of the drawing.

In the ink-jet printer 50, the recording medium P is carried upward from the lateral position by the supply unit 54 and supplied to the preheating unit 56, then heated at the recording side thereof by the heater 72 while being sandwiched and carried by the conveyor 68 and the press roller 70, and then carried to the recording unit 52.

In the recording unit 52, when the image data D is inputted to the recording control unit 34, the signal values of the image data D are converted in the recording control unit 34 to obtain the gradation level values. Pulse control signals are prepared in the pulse control signal preparation unit 32 so that the dot patterns as described above can be formed in accordance with the gradation level values obtained. The pulse control signals are sent to the oscillator circuits 30a, 30b, 30c . . . and 30'a, 30'b, 30'c . . . and there prepared desired control voltage signals based on the pulse control signals. Thereafter, the control voltage signals are applied to the terminals 28a, 28b, 28c . . . and 28'a, 28'b, 28'c . . . , and the vibration plates are vibrated. Thus, ink droplets are ejected against the recording medium P at a desired timing and in a desired ejection amount to put dots on the medium P. In the case of a color image, the gradation level values for the respective colors are determined based on the signal values of the image data D, and the pulse control signals for setting the control voltage signals to be applied to the recording heads for the respective colors are prepared.

Meanwhile, the color recording head 40 is made to scan in the direction perpendicular to the plane of the drawing.

Moreover, the recording medium P is carried by the recording medium carriage unit 78. Thus, an image is recorded on the recording medium P.

The recording medium P on which the image is recorded is discharged from the discharge unit 58.

The color recording head 40 of the ink-jet printer 50 in the above-described embodiment employs the structure of the recording head 10 shown in FIGS. 1A and 1B. However, the ink-jet printer for realizing the present invention may be an ink-jet printer, in which the recording head unit 76 and the recording control unit 34 in the recording unit 52 of the ink-jet printer 50 are replaced with a recording head unit 100 and a recording control unit 102 as shown in FIG. 6.

Figure 6:
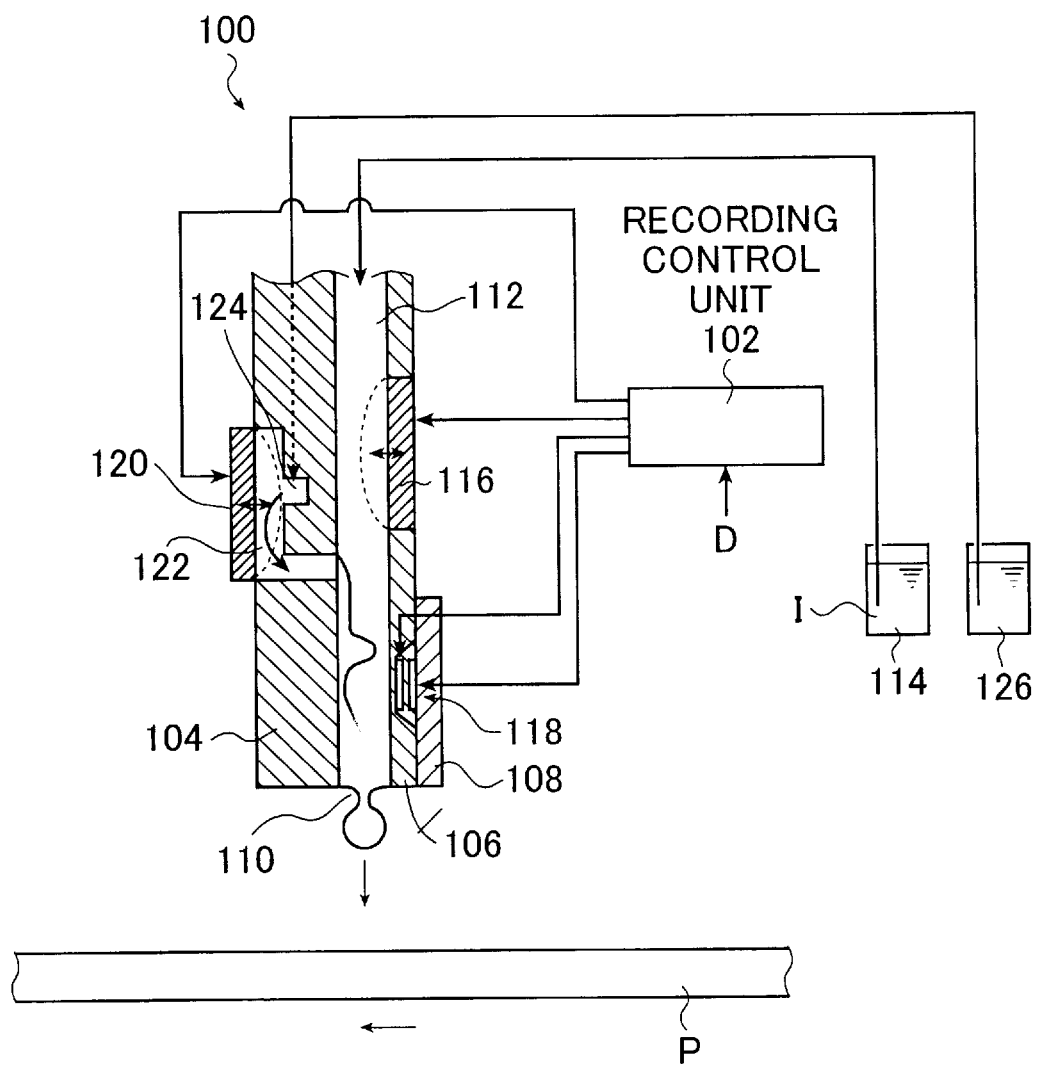
FIG. 6 is an explanatory view explaining a principal portion of the configuration of another embodiment of the printer for realizing the gradation reproduction method of the present invention.

Note that, FIG. 6 shows each structural component with a thickness larger than that of the actual one.

Moreover, though the recording head unit 100 includes a plurality of ink ejection nozzles, FIG. 6 shows the structure of the part of the recording head unit 100, which corresponds to one ink ejection nozzle.

Unlike the case of the ink-jet printer 50, the recording head 100 is a recording head, in which the light ink L of neither the color C nor the color M is provided, but by use of an ink diluent, the ink I of the color C and the ink I of the color M are diluted immediately before image recording in order to prepare desired ink having a low optical density, then the ink diluted is ejected to record an image. The recording head 100 has a three-layer structure constituted by laminating substrates 104, 106, and 108, and an ink ejection nozzle 110 and an ink path 112 are defined by the substrates 104 and 106. The ink path 112 is connected to an ink tank 114.

The substrate 106 has an ink flow amount control valve 116 for controlling the flow amount of ink. Further, the substrate 106 provides in cooperation with the substrate 108, in the vicinity of the ink ejection nozzle 110, an electrostatic capacitance-type actuator 118 having a configuration similar to that of the electrostatic capacitance-type actuator 27 shown in FIG. 1A.

Meanwhile, the substrate 104 has an ink diluent chamber 122 provided with an ink-diluent flow amount control valve 120, and is constituted in such a manner that the ink diluent is always supplied to the ink diluent chamber 122 from an ink diluent tank 126 connected thereto through an ink diluent path 124.

The recording control unit 102 converts the signal values of the image data D from an image data input source so that they can correspond to the gradation levels preset in the recording control unit 102 to obtain the gradation level values. Then, the recording control unit 102 determines the mixture ratio of the ink diluent and the ink I and prepares pulse control signals for driving the ink flow amount control valve 116 and the ink-diluent flow amount control valve 120 so that the image can be recorded employing the dot patterns set in the recording control unit 102 in accordance with the gradation level values obtained. In addition, the recording control unit 102 determines an ink ejection amount, and prepares the pulse control signals for driving the electrostatic capacitance-type actuator 118. Thereafter, the recording control unit 102 prepares the control voltage signals in accordance with the pulse control signals and applies them to the ink flow amount control valve 116, the ink-diluent flow amount control valve 120, and the electrostatic capacitance-type actuator 118.

The recording head 100 has such a configuration as described above. Therefore, in the case where the ink having a low optical density is prepared by diluting the ink I, the ink-diluent flow amount control valve 120 is driven and deformed as shown by a dotted line in FIG. 6 in response to the control voltage signals applied thereto from the recording control unit 102. As a result, a desired amount of the ink diluent is sent from the ink diluent chamber 122 to the ink path 112. At the same time, the ink flow amount control valve 116 is driven and deformed as shown by a dotted line in FIG. 6 in response to the control voltage signals applied thereto. Also at the same time, the vibration plate of the electrostatic capacitance-type actuator 118 is deformed to protrude inward upon receiving the control voltage signals. Consequently, the ink I and the ink diluent are squeezed out by a desired amount toward the ink ejection nozzle 110, and then mixed. In such a manner, the ink having a low optical density similar to the light ink L can be prepared immediately before the ink droplets are ejected.

Thereafter, the vibration plate of the electrostatic capacitance-type actuator 118, which has received the control voltage signals, is restored at a specified timing, and the diluted ink is ejected from the ink ejection nozzle 110. The ejection amount of ink is controlled by the electrostatic capacitance-type actuator 118. The ink flow amount control valve 116 and the ink-diluent flow amount control valve 120 are controlled such that the diluted ink is prepared in an amount equal to the amount of ink to be ejected and is thereby ejected entirely.

In the case where the ink I is used as it is without being diluted, the ink-diluent flow amount control valve 120 is not driven, but the electrostatic capacitance-type actuator 118 is driven, or alternatively, the electrostatic capacitance-type actuator 118 and the ink flow amount control valve 116 are driven, thus a desired amount of ink is ejected.

In this way, a specified dot pattern is recorded on the recording medium P.

The recording head 100 in the above-described embodiment adopts an ink ejection mode, in which the ink ejection direction is perpendicular to the moving direction of the vibration surface of the electrostatic capacitance-type actuator 118. However, an ink ejection mode as employed for the recording head 10 may be employed, in which the ink ejection direction coincides with the moving direction of the vibration surface of the electrostatic capacitance-type actuator 118.

An in-print reproduced image recorded on the recording medium P as described above can be obtained as a preferred example of the gradation-reproduced image of the present invention. The gradation of the in-print reproduced image can be depicted with such dot patterns as shown in FIGS. 3A to 3D allowing a large number of gradation levels to be set. Accordingly, a smooth image is reproduced. Moreover, since the error diffusion method is not required as before, a reproduced image without any graininess can be obtained.

For example, by use of a recording head with a resolution of 1200 DPI, the gradation reproduction is performed with dot patterns in which the minimum size of dots is set to 25 μm and the dots are arranged at intervals of 145 μm. In this case, the dots are unobtrusive, and a smooth image is reproduced. It is a matter of course that such an in-print reproduced image may be applied to a reproduced image of a silver photograph and the like.

Moreover, at the highlight gradation levels, dot patterns are formed of dots having a low density. Therefore, the macro density can be accurately reproduced according to the gradation level.

Furthermore, in the case where the dots are randomly arranged, the long-period tone variation component does not occur on the image, thus any periodical structure is inconspicuous on the image.

Furthermore, at the shadow gradation levels, the dots having a low optical density are arranged on the non-dot portions among the dots periodically arranged at substantially constant intervals. Accordingly, no blur occurs, and the macro density can be accurately reproduced according to the gradation level.

In the above, description has been made for the gradation reproduction method with the ink-jet printer taken as an example. However, the gradation reproduction method as described above can be applied to the electrophotographic printer conventionally performing the gradation depiction by halftone dots, to the thermal printer of a thermofusion transfer mode or the like capable of varying the size of dots depending on a conduction time, and further to the offset printing field. In-print reproduced images outputted by such various printers also have effects as described above.

As above, description has been made in detail for the gradation reproduction method and the gradation-reproduced image of the present invention. However, the present invention is not limited to the above-described embodiments. It is a matter of course that various modifications and alterations may be made in the scope without departing from the gist of the present invention.

As described above in detail, according to the present invention, since the dot patterns of highlight gradation levels are formed of the dots having a low optical density, the macro density can be accurately reproduced according to the gradation level. Moreover, in the case where the dots are randomly arranged, the long-period tone variation component does not occur on the image, and any periodical structure is inconspicuous on the image. Furthermore, at the shadow gradation levels, the dots having a low optical density are arranged on the non-dot portions of the dot pattern having the dots periodically arranged. Therefore, no blur occurs, and the macro density can be accurately reproduced according to the gradation level. Consequently, the graininess at the middle-level gradation, which has been caused by using the error diffusion method in the conventional ink-jet printer, is eliminated, and the tone jump due to the blur at the shadow gradation levels does not occur, either. Moreover, the graininess at the highlight gradation levels, which has been caused in the electrophotographic printer, is also eliminated, and it is made possible to depict a fine image by the thermal printer. Also in the offset printing field, a multi-level gradation image can be obtained without using a high-accuracy recording head.

What is claimed is:

1. A gradation reproduction method, comprising the steps of:

arranging periodically dots changing a size thereof in response to a gradation level when a plurality of gradation levels for depicting an image are reproduced by dot patterns; and reproducing said plurality of gradation levels including at least a gradation level having an area coverage modulation ratio of approximately 50%;

wherein a gradation level having the area coverage modulation ratio of 10% or less is reproduced by dots having a micro density lower than a micro density of dots for reproducing a solid portion.

2. The gradation reproduction method according to claim 1, wherein said gradation level having the area coverage modulation ratio of 10% or less is reproduced by arranging the dots randomly in an inconstant interval.

3. The gradation reproduction method according to claim 1, wherein at least one gradation level including a gradation level having the area coverage modulation ratio of approximately 90% is reproduced by periodically arranging dots having a micro density equal to the micro density of the dots for reproducing the solid portion in an approximately constant interval, and by arranging the dots having the micro density lower than the micro density of the dots for reproducing the solid portion on gaps among the dots periodically arranged.

4. The gradation reproduction method according to claim 1, wherein at least one gradation level including the gradation level having the area coverage modulation ratio of approximately 50% is reproduced by changing orientations of dots in response to dot colors.

5. The gradation reproduction method according to claim 1,
wherein the dots are formed by ejecting ink from a recording head, and
ink having an optical density lower than an optical density of ink for reproducing the solid portion is used when gradation levels are reproduced by the dots having the micro density lower than the micro density of the dots for reproducing the solid portion.

6. The gradation reproduction method according to claim 5, wherein the ink having the lower optical density is used for the recording head different from the recording head using the ink for reproducing the solid portion.

7. The gradation reproduction method according to claim 5, wherein the ink having the low optical density is prepared by diluting the ink for reproducing the solid portion with an ink diluent immediately before image recording.

8. A gradation-reproduced image, comprising dot patterns constituting a plurality of gradation levels of an image, said dot patterns including:

a dot pattern having dots different in size depending on a gradation level which is formed by being arranged periodically in an approximately constant interval in said plurality of gradation levels including at least a gradation level having an area coverage modulation ratio of approximately 50%; and a dot pattern which is formed of dots having a micro density lower than a micro density of dos for reproducing a solid portion in a gradation level having the area coverage modulation ratio of 10% or less.

9. The gradation-reproduced image according to claim 8, wherein a dot pattern having dots arranged randomly in an inconstant interval is formed in the gradation level having the area coverage modulation ration of 10% or less.

10. The gradation-reproduced image according to claim 8, wherein dots having a micro density equal to the micro density of the dots for reproducing the solid portion are arranged periodically in the approximately constant interval in at least one gradation level including a gradation level having the area coverage modulation ratio of approximately 90%, and dots having a micro density lower than the micro density of the dots for reproducing the solid portion are disposed on gaps among the dots arranged periodically, thus the dot pattern is formed.

11. The gradation-reproduced image according to claim 8, wherein the dot pattern having dots different in orientation depending on each of colors of the dots is formed in a dot pattern of at least one gradation level including the gradation level having the area coverage modulation ratio of approximately 50%.

* * * * *